Sept. 26, 1939.  S. H. TUMMINS  2,174,145
WALLBOARD FASTENER
Filed Oct. 24, 1938
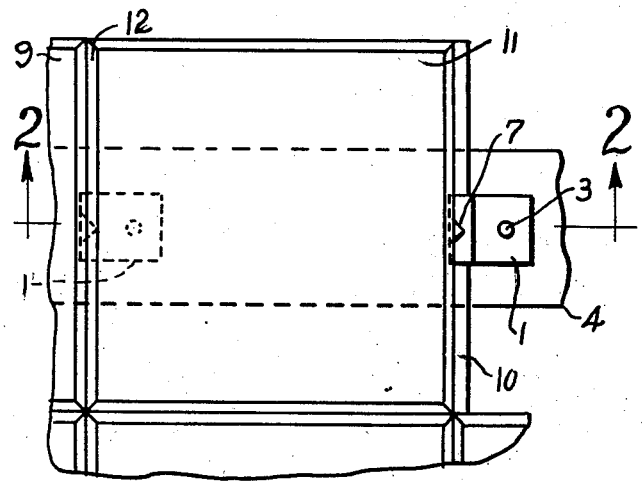
Fig. 1.
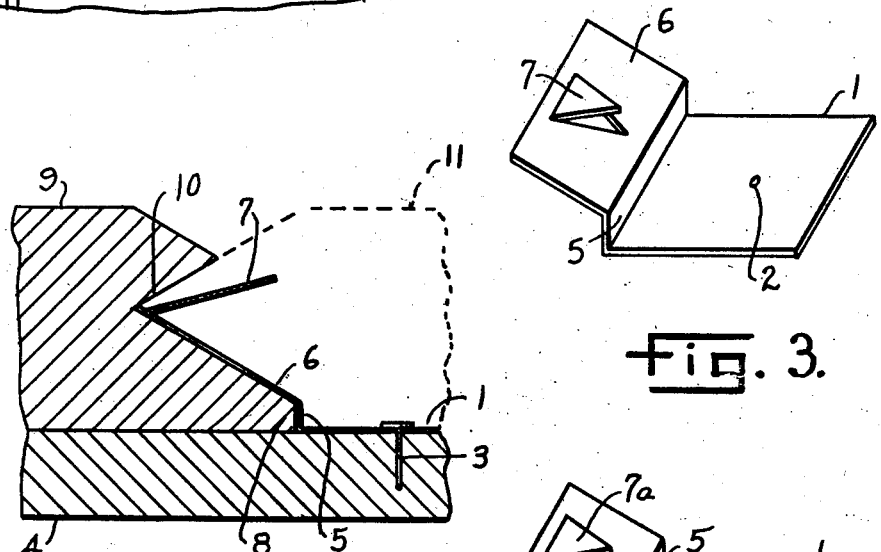
Fig. 2.
Fig. 3.
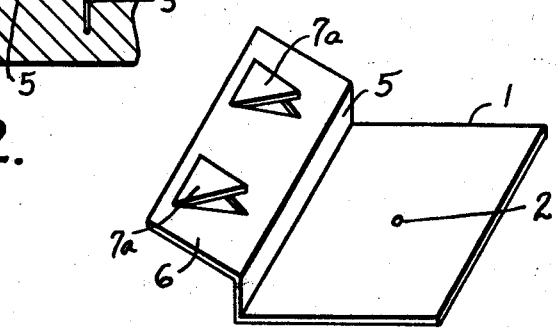
Fig. 4.
Inventor
SAMUEL H. TUMMINS
By
Edward V. Hardway
Attorney Patented Sept. 26, 1939

2,174,145

UNITED STATES PATENT OFFICE 2,174,145

WALLBOARD FASTENER

Samuel H. Tummins, Houston, Tex.

Application October 24, 1938, Serial No. 236,664

7 Claims. (Cl. 72—118)

This invention relates to a wall board fastener.

An object of the invention is to provide a fastener of the character described specifically designed for securing wall boards, or panels, to the furring strips or other wall supporting framework, which will securely hold the wall boards, or panels, in place and which, when applied, will be invisible.

The fastener herein described has been specifically shaped so as to fit into the bevel-lap joint between adjacent boards, or panels.

Another object of the invention is to provide a fastener of the character described formed of thin, light, strong material which will readily fit into, and be concealed in, the joint formed between adjacent boards, or panels, which may be cheaply and easily produced and readily applied and which is very efficient in securing the wall in place.

With the above and other objects in view the invention has particular relation to certain novel features of construction and use, an example of which is given in this specification and illustrated in the accompanying drawing, wherein:

Figure 1 shows a fragmentary, elevational view showing the fastener applied as in use.

Figure 2 shows an enlarged, fragmentary, horizontal, sectional view taken on the line 2—2 of Figure 1.

Figure 3 shows a perspective view of the fastener, and

Figure 4 shows a perspective view illustrating another embodiment.

Referring now more particularly to the drawing wherein like numerals of reference designate the same parts in each of the figures, the numeral 1 designates the base portion of the fastener which is provided with a nail hole 2 to receive the nail 3. The base is flat so as to fit firmly against the furring strip 4 of the wall framework.

The material of the fastener, at one margin of the base, is overturned forming an abutment 5 at approximately right angles to the base 1 and is extended diagonally, relative to the abutment forming the clamp 6. A tang 7, terminating in a sharp point or apex, is thrown outwardly, and forwardly, from the material of the clamp 6, as shown in Figure 3. Two of said tangs as 7a may be similarly formed as shown in Figure 4.

In application the base 1 may be secured to the furring strip 4 by the nail 3 as shown in Figure 1 with the abutment 5 in close abutting relation with the adjacent margin 8 of the wall board, or panel, 9 and with the clamp 6 fitting closely against the adjacent side of the groove 10, thus clamping the board, or panel, 9 firmly against the furring strip. The adjacent board, or panel, 11 may then be inserted into place with its tongue 12 fitting closely into the groove 10. When so inserted into place the tang 7 will penetrate into the material of the board, or panel, 11 as indicated in Figures 1 and 2 so as to hold the margin of the board last inserted securely in place. One margin of each board, or panel, will thus be clamped against the furring stripping by the clamp 6 while its opposite margin will be secured in place by the tang of the adjacent fastener. The fastener will thus be completely concealed from view but will hold the boards, or panels, firmly secured to the adjacent furring strips.

The drawing and description disclose what is now considered to be a preferred form of the invention by way of illustration, only, while the broad principle of the invention will be defined by the appended claims.

What I claim is:

1. A wall board fastener comprising a flat base having a nail hole therein and formed with an overturned abutment at one margin at approximately right angles to the plane of the base, said abutment having a diagonal extension forming a clamp and an outwardly projecting tang on the clamp.

2. A wall board fastener comprising a flat base, a clamp member extended in a diagonal direction with respect to, and formed integrally with the base and adapted to overlie and clamp the adjacent margin of a wall board and a forwardly projecting tang on the clamp and adapted to penetrate into the adjacent margin of another wall board.

3. A wall board fastener formed of sheet metal and comprising a flat base portion, a marginal abutment at one side of the base portion at approximately right angles thereto against which the margin of an adjacent board may abut, a clamp portion diagonally related to the abutment adapted to clamp against and securely hold said adjacent margin in position, a forwardly projecting tang thrown out from the material of the clamp portion and adapted to penetrate into the adjacent margin of another wall board, said base portion, marginal abutment, clamp portion and tang being all formed of a single piece of material.

4. A wall board fastener comprising a substantially flat base, a clamp portion extended from and formed with the base and adapted to overlie and clamp a portion of an adjacent marginal edge of a wall board, and a tang projecting from the clamp and adapted to penetrate into the adjacent margin of another wall board.

5. A wall board fastener comprising a flat base, a clamp portion extended from and formed integrally with the base and adapted to extend into overlying flush engagement with and securely clamp a portion of an adjacent marginal edge of a wall board, and a forwardly projecting tang on the clamp adapted to penetrate into the adjacent margin of another wall board.

6. In a building construction, the combination with a supporting element and a plurality of wall covering elements having interlocking side edges, of a fastening member comprising a base attached to said supporting element, an extended portion on said base provided with a prong adapted to be forced into the interlocking side edge of one of the said wall covering elements, said extended portion engaging with the interlocking side edge of an adjacent wall covering element whereby said extended portion clamps the interlocking side edge of said last mentioned element and said wall covering element to said supporting element.

7. In a building construction, the combination with a supporting element and a plurality of wall covering elements having interlocking male and female side edges, of a fastening member comprising a base attached to said supporting element, an extended portion on said base provided with a prong adapted to be forced into the male side edge of one of said wall covering elements, said extended portion engaging with the female side edge of an adjacent wall covering element whereby said extended portion clamps said female side edge and said wall covering element to said supporting element.

SAMUEL H. TUMMINS.